United States Patent Office 3,147,184
Patented Sept. 1, 1964

3,147,184
GRISONOMYCIN AND PROCESS FOR ITS
MANUFACTURE
Ernst Gaeumann, Zurich, and Hans Bickel, Binningen, Switzerland, assignors to Ciba Corporation, a corporation of Delaware
No Drawing. Filed Oct. 13, 1958, Ser. No. 766,669
Claims priority, application, Switzerland, Nov. 1, 1957, 52,173; Sept. 2, 1958, 63,512
24 Claims. (Cl. 167—65)

This invention provides a new water-soluble antibiotic, which is hereinafter referred to as Grisonomycin and derivatives thereof, and also pharmaceutical preparations containing these compounds, and a process for the manufacture of these compounds, or mixture thereof.

Antibiotic Grisonomycin has been isolated by the culture of a new strain of Actinomycetes which was collected from a soil sample to Bergun, in the Canton of Graubunden, Switzerland, and is kept in our laboratories and also in the Federal Institute of Technology, Institut für spezielle Botanik under the designation A–10073. The microorganism *Streptomyces griseus* A–10073 has been deposited at the U.S. Department of Agriculture, Agriculture Research Service, Northern Utilization Research and Development Division, Peoria, Illinois, and has received the culture collection number NRRL 2720.

The strain A–10073 of Actinomycetes belongs to the species *Streptomyces griseus*. It forms a yellowish-greenish grey air mycelium. Its spore chains are irregularly branched and form no spirals. The individual spores are smooth. When the organism is cultivated on a nutrient substratum containing peptone, no brown-black melanoid coloration is observed. Its growth is relatively little dependent on temperature, as the mould develops equally well at 18° C. as 40° C., but the optimum growth is between 25° C. and 32° C.

For the purpose of identification the growth of *Streptomyces griseus* A–10073 on various nutrient media is described below. The nutrient media 1–7 and 10 were prepared as described by W. Lindenbein, Arch. Mikrobiol., vol. 17, page 361 (1952).

(1) Synthetic agar: Growth initially thin, cloud-like and light yellow, later wrinkled and light brown to copper red. Air mycelium velvety, light yellow to greenish grey.
(2) Synthetic solution: Sediment flocks, milk white. Pellicle initially yellowish, and reddish brown after 9 days. Air mycelium velvety white grey.
(3) Glucose-agar: Growth sparse, thin, cloud-like and light yellow.
(4) Glucose-asparagin-agar: Growth thin, cloud-like, light yellow. Air mycelium covered with floury dust, light yellow.
(5) Calcium malate-agar: Growth cloud-like, light brown. Air mycelium velvety, light yellow to greenish grey. Substratum chestnut brown.
(6) Gelatine stab culture (18° C.): Growth superficial, cloud-like, brownish yellow, substratum reddish brown. Liquefaction after 18 days amounts to 0.8–1.2 cm.
(7) Starch plates: Growth thin, cloud-like, colorless to light yellow. Air mycelium poorly developed, light yellow. Substratum grey-blue. Hydrolysis after 14 days amounts to 1.6 cm.
(8) Potatoes: Growth cloud-like, light brown to white grey. Air mycelium sparse, light yellow to greenish grey. Substratum very slow, light yellow.
(9) Carrots: Growth very slow, light yellow.
(10) Litmus milk: Pellicle light brown. Air mycelium velvety, colorless to light yellow, finally greenish grey. Substratum red. Slow coagulation and hydrolysis.

The most important characteristics of strain A–10073 correspond to those of *Streptomyces griseus* (Krainsky) Waksman, so that the former was at first considered to be the latter species.

It is known that a few members of the species *Streptomyces griseus* produce antibiotics, for example, streptomycin, Candicidin, Grisein and streptocin. As is shown below the new antibiotic Grisonomycin differs in a characteristic manner from these known antibiotics.

Insofar as the present invention includes the manufacture of antibiotic Grisonomycin it is not limited to the use of *Streptomyces griseus* A–10073 or other strains corresponding to the same description, but includes the use of variants of these organisms such as are obtained, for example, by selection or mutation, especially under the action of ultra-violet rays or X-rays or nitrogen mustard oils.

In order to produce antibiotic Grisonomycin a strain of streptomycetes having the properties of *Streptomyces griseus* A–10073 is aerobically cultivated, for example, in an aqueous nutrient solution containing a source of carbon and of nitrogen and inorganic solvents, until the solution exhibits a substantial antibiotic action, and antibiotic Grisonomycin is then isolated.

As source of carbon, for example such as, glucose, saccharose, lactose, mannitol or starches, or glycerine may be used. As nitrogenous nutrients and, if desired, growth-promoting substances there may be mentioned, aminoacids, peptides and proteins, and also their degradation products, such as peptone, tryptone, and also meat extracts, and the water-soluble constituents of cereal grains such as maize and wheat, of distillation residues in the manufacture of alcohol, of yeast, beans, especially those of soya bean plants, of seeds, for example, of cotton plants and the like, and also ammonium salts and nitrates. Among other inorganic salts the nutrient solution may contain, for example, chlorides, carbonates or sulfates of alkali metals, alkaline earth metals, magnesium, iron, zinc or manganese.

The cultivation is carried out aerobically, for example, in a quiescent surface culture or advantageously immersed while being agitated or stirred with air or oxygen in a shaking bottle or a known fermenter. A suitable temperature is within the range of 18° C.–40° C. The nutrient solution generally exhibits a substantial antibiotic action after 1½ days.

In order to isolate antibiotic Grisonomycin the following methods may be used: The mycelium is separated from the culture filtrate, the bulk of the antibiotic being found in the culture filtrate. However, appreciable amounts of the antibiotic remain adsorbed on the mycelium. It is therefore of advantage to wash the mycelium well. For this purpose there may be used water or an aqueous organic solvent, such as an alcohol, for example, aqueous methanol.

Antibiotic Grisonomycin is a water-soluble substance, which is insoluble in organic solvents, especially in lipoid solvents. It cannot be precipitated at a neutral pH value from culture filtrates or enriched solutions with the usual precipitants used for isolating basic hydrophilic antibiotics, for example, picric acid, ammonium reineckate, helianthin, and picrolonic acid. Its behavior in electrometric titration, in electrophoresis on paper and in adsorption on ion-exchangers, indicates that it is probably an amphoteric substance having predominant basic properties.

By virtue of these properties antibiotic Grisonomycin can be recovered from the culture filtrate and purified by various methods which may be used singly or in combination with one another. Thus, various adsorption agents may be used, for example, active carbons such as Norit, activated earths, such as aluminum oxide, fuller's earth or Floridin, resin adsorbers, such as Asmit. Antibiotic Grisonomycin has a very strong affinity especially for Norit (activated carbon) over a wide pH-range and for Asmit, a m-phenylenediamine-formaldehyde decolorizing resin (United States Patent No. 2,854,484) in the neutral and alkaline pH-range. Antibiotic Grisonomycin can also be adsorbed from the culture filtrate or aqueous solutions by strongly acid ion-exchangers, for example Dowex 50, a polystyrene nuclear sulfonic acid cationic resin (United States Patent No. 2,366,007).

The adsorbate is advantageously eluted by means of a mixture of water and an organic solvent, for example, a binary mixture of water with an organic solvent miscible with water, for example, water-methanol, water-acetone, water-alcohol, water-propanol, water-pyridine or multi-component systems such as water and an organic solvent immiscible with water and one or more organic solvents miscible with water serving as mixing promoters, for example, butanol-methanol-water, butanol-pyridine-methanol-water or phenol-methanol-water. These solvent mixtures serving for elution may be used with or without the addition of an inorganic or organic acid, for example, hydrochloric acid, sulfuric acid, formic acid or acetic acid, or with or without the addition of a basic agent, for example, ammonia or a lower aliphatic amine. When Norit is used as an adsorption agent mixtures of butanol-methanol-water in the volumetric ratio 2:1:2, butanol-methanol-pyridine-water in the volumetric ratio 2:1:1:2 or alcohol-water in the volumetric ratio 3:2 have been found especially suitable for elution of the antibiotic. Adsorbates on Asmit-phenol resin are advantageously eluted with a mixture of methanol-water-1 N-hydrochloric acid in the volumetric ratio 75:15:10 and adsorbates on the aforesaid ion-exchangers are advantageously eluted with basic agents, for example, an aqueous solution of ammonia.

From the antibiotically active eluates, the antibiotic can be obtained by removing the solvent in vacuo in the form of a dry powder or in the form of a strongly concentrated solution from which the antibiotic can be precipitated in the form of a brown-yellow powder by the addition of 4 to 6 times the volume of acetone or of a mixture of methanol and acetone. When the elution agent contains a solvent immiscible with water, for example, in the case of adsorption on Norit the aforesaid mixture of butanol-methanol-water (2:1:2) there is advantageously added a further solvent immiscible with water, for example, ether, chloroform, ethyl acetate or n-butyl acetate, in a proportion such that two phases are formed. The antibiotic is then found almost exclusively in the aqueous phase, from which it can be obtained in the form of a powder by cautions direct evaporation to dryness or by concentration to a concentrated solution followed by precipitation. When the elution agent contains a base or acid, for example, in the case of adsorption on Asmit the aforesaid mixture methanol-water-1 N-hydrochloric acid (75:15:10), it is of advantage to neutralize the acid or base in the eluate before it is concentrated by the addition of an alkaline solution or an acid, or the acid or base may be removed from the elution agent by filtration through a weak anion-exchanger, such as Amberlite IR-4B, phenolic amine anionic resin (United States Patent No. 2,356,151), a weak cation-exchanger such as Amberlite IRC-50, methacrylic carboxylic acid cationic resin (United States Patent No. 2,340,111), on which the antibiotic Grisonomycin is not adsorbed.

The antibiotic Grisonomycin is soluble in phenol and in mixtures of phenol with organic solvents, e.g. a mixture of phenol and chloroform. From aqueous solutions it can be extracted by means of such mixtures. When the antibiotic is distributed between aqueous hydrochloric acid solutions and phenolic chloroform solution, the distribution coefficient can be adjusted within a wide range by changing the concentration of phenol in the organic phase and/or by changing the concentration of hydrochloric acid in the aqueous phase. If the distribution coefficient of the antibiotic is assumed to be the ratio of concentration in the organic phase to the concentration in the aqueous phase, it follows that the distribution coefficient is the higher the higher the phenol content and the lower the higher the hydrochloric acid concentration. By combining but a few distributing operations in such systems, a substantially enrichment can be achieved. From phenol chloroform mixtures the antibiotic can be precipitated in powder form, e.g. with acetone, ether or petroleum ether. Another method of isolation consists in precipitating the antibiotic from the phenol/chloroform mixture by means of one of the aforementioned solvents, onto a filter aid, as for example Hyflo Supercel (an infusorial earth) and thoroughly washing the readily filterable residue with the same solvent. The antibiotic residue precipitated onto the filter aid can be dissolved out with a small amount of water, and the resulting concentrated solution of the antibiotic converted into the powder form by freeze drying. Still another method consists in extracting the antibiotic directly from the phenol/chloroform solution after the addition of a mixture of ether and petroleum ether, using a small quantity of water.

The above described adsorption elution and extraction processes may be carried out singly or in combination with one another. Especially suitable is a combined process in which the antibiotic is first adsorbed on Asmit and then eluted, followed by adsorption on Norit and elution. The resulting antibiotic concentrate is then enriched by a number of distributions between phenol/chloroform solutions and hydrochloric acid solution.

The adsorption-elution processes may be carried out by the batch method or in a column. Prior to the elution of the adsorbate, the adsorption agent laden with the antibiotic may be washed with suitable solvents to remove the antibiotically inactive accompanying substances. In the case of adsorbates on Norit water, methanol of 30% strength and dry acetone are suitable washing agents.

Antibiotic Grisonomycin can be enriched from concentrates obtained by the methods described above, by adding to solutions of such concentrates precipitants such, for example, as picric acid or helianthine, whereby substances which accompany the antibiotic and some of which exhibit antibiotic action in vitro, are precipitated and the antibiotic itself remains in solution. After separating the precipitate by filtration the excess of precipitant is removed from the filtrate by passing it through a suitable ion-exchanger, in the case of helianthine or picric acid, for example, by passage through Amberlite IRA-400 in the chloridion-form, after which the enriched antibiotic can be isolated from the solution in the manner described above.

In order further to enrich the antibiotic it is of advantage to subject it to adsorption chromatography through a column. As adsorbants there may be used the adsorption agents mentioned above for the isolation processes. The antibiotic may also be chromatographed on cellulose. For developing the chromatogram there are used the same solvent mixtures as those mentioned for the elution of the adsorbate in the isolation processes referred to above, and the solvent mixtures may be used at a constant or varying composition. An advantageous enrichment process is column chromatography over Norit, the active carbon being advantageously diluted in the ratio by weight of 1:1 to 1:2 with a filtration assistant, for example, Hyflo Supercel or Celite, infusorial earths, in order to increase the speed of flow of the elution medium. Especially suitable for enriching the antibiotic is chromatography over cellulose columns. In this case there is suitable as elution medium a mixture of butanol-methanol-water in the volumetric ratio 4:1:2.

Antibiotic Grisonomycin is obtained in this manner in the form of a highly antibiotically active pale yellow powder which is characterized by its solubility properties by paper chromatography and electrophoresis, and also by its behavior towards coloring and precipitating reagents. Antibiotic Grisonomycin dissolves very well in water. It also dissolves in mixtures of water with lower alcohols, in phenol, and in mixtures of phenol with organic solvents. It is insoluble in the usual organic solvents, especially lipoid solvents. The behavior of Grisonomycin in paper chromatography on Whatman No. 1 paper is compared in the following table with that of streptomycin sulfate (1), ristocetin A (2) and ristocetin B (3).

| Solvent mixture | A-10073 | Rf-value | | |
|---|---|---|---|---|
| | | 1 | 2 | 3 |
| A | 0 | 0 | 0 | 0 |
| B | 0 | 0.12 | 0 | 0 |
| C | 0.15 | 0.25 | 0.22 | 0.19 |
| D | 0.52 | 0.61 | 0.53 | 0.24 |
| E | 5.15 | 1 | 5.15 | 11.4 |
| F | 0.65 | 0.07 | 0.69 | 0.69 |
| G | 0.92 | 0.13 | 0.41 | 0.25 |
| H | 0.90 | 0.29 | 0.38 | 0.17 |
| I | 0.11 | 0.15 | 0.05 | 0.25 |

A = butanol saturated with water.
B = butanol saturated with water + 2% of para-toluene sulfonic acid.
C = aqueous ethanol of 80% strength containing 1.5% of sodium chloride on Whatman No. 4, impregnated with 0.95 m $Na_2SO_4$ and 0.05 m $NaHSO_4$—$H_2O$.
D = aqueous methanol of 80% strength containing 1.5% of sodium chloride.
E = butanol-methanol-water 3½ : 1 : 2.
F = butanol-ethanol-water 1 : 1 : 2.
G = water saturated with methyl isobutyl-ketone.
H = 75% of water + 25% of a mixture of 3 parts of methanol and 1 part of acetone, the whole being brought to a pH value of 10.5 with ammonia and brought back to a pH value of 7.5 with phosphoric acid.
I = secondary butanol saturated with water + 0.2% of trichloracetic acid.
(In the case of the solvent system E, the figures given represent the ratio of the path of the antibiotic to the path of streptomycin sulfate.)

In paper chromatography the antibiotic Grisonmycin shows a similar behavior to that of grisein. The latter, however, travels faster than Grisonomycin in most systems, e.g. in the system butanol/glacial acetic acid/$H_2O$ (4:1:5) 1.4 times faster and in the system C 1.3 times faster.

In electrophoresis on Whatman No. 1 paper the antibiotic Grisonomycin migrates to the cathode in an 0.03-molar potassium-sodium phosphate buffer having a pH value of 5.5 at a voltage of 110 in the course of 5 hours to the extent of 4.2 centimeters. Under the same conditions streptomycin sulfate, ristocetin A and ristocetin B exhibit paths of migration of 8.3, 5.0 and 3.9 centimeters respectively. In an 0.2-molar borate buffer having a pH value of 8.13 antibiotic Brisonomycin migrates under otherwise identical conditions 2.9 centimeters towards the cathode. In this case streptomycin, ristocetin A and ristocetin B migrate 6.7, 3.4 and 3.4 centimeters, respectively, in the same direction.

Upon the dropwise addition of a saturated aqueous solution of picric acid, ammonium reineckate, helianthin or of a saturated solution of picrolonic acid in alcohol of 90% strength to a neutral aqueous solution of 10% strength of antibiotic Grisonomycin no precipitate is formed, and in the case of helianthin at most a slight turbidity is formed. Also negative are the Sackaguchi, Maltol, Elson-Morgan, biuret and Benedict tests.

Antibiotic Grisonomycin also differs in its solubility properties, its characteristic color, its color reactions and its behavior in paper chromatography from the antibiotics produced by members of the species *Streptomyces griseus*, namely streptomycin, rhodomycetin, actidion, streptocin, grisein and candicidin.

Antibiotic Grisonomycin has a high activity against various microorganisms. By using as in vitro test methods series of dilutions successively to the power of 10 in glucose broth, the following concentrations just checked the growth of various test organisms after incubating for 2 hours at 37° C.

Test organisms: Inhibiting concentration, ug./cm.³
Micrococcus pyogenes, var. *aureus* ———— 1
*Streptococcus pyogenes* ———— 1
*Streptococcus viridans* ———— 1
*Corynebacterium diphtheriae* ———— 1
*Escherichia coli* ———— 1
*Echerichia coli*, streptomycin-resistant ———— 1
*Escherichia coli*, chloromycetin-resistant ———— 1
*Shigella sonnei* ———— 1
*Pseudomonas aeruginosa* ———— 1
Klebsiella Type A ———— 1
*Pasteurella pestis* ———— 1
*Bacillus megatherium* ———— 1
*Endomyces albicans* ———— 1

By using for in vitro tests the plate test method with paper rondels of 6 mm. diameter there were obtained with a solution of 1% strength of antibiotic Grisonomycin the following checking zones.

Test organisms: Inhibition zone in millimeters
*Micrococcus pyogenes*, var. *aureus* ———— 21
*Micrococcus pyogenes*, var. *aureus*, penicillin-resistant ———— 20
*Escherichia coli* ———— 18
*Escherichia coli*, streptomycin-resistant ———— 18
*Escherichia coli*, chloromycetin-resistant ———— 18
*Pseudomonas aeruginosa* ———— 12
Klebsiella Type A ———— 17
*Bacillus subtilis* ———— 19

Antibiotic Grisonomycin is also active in vivo. When mice infected with Klebsiella type A were given two subcutaneous injections of 20 milligrams of the antibiotic per kilogram of body weight 100% of survivals were observed. These doses were tolerated without harm by non-infected mice.

Antibiotic Grisonomycin and derivatives thereof are useful as medicaments, for example, in the form of pharmaceutical preparations. These preparations contain the aforesaid compounds in admixture with a pharmaceutical organic or inorganic carrier suitable for enteral, parenteral or local administration. For making the carriers there are used substances which do not react with the new compounds, for example gelatine, lactose, starche, magnesium searate, talc, vegetable oils, benzyl alcohols, gums, alkylene glycols, white petroleum jelly, cholesterol or other known carrier for medicaments. The pharmaceutical preparations may be in the form, for example, of tablets, dragées, powders, salves, creams, suppositories or in liquid form as solutions, suspensions or emulsions. If desired they may be sterilized and/or may contain auxiliary substances, such as preserving, stabilising, wetting or emulsifying agents. They may also contain other therapeutically valuable substances.

The following examples illustrate the invention:

*Example 1*

Streptomyces A-10073 is cultivated by the immersion method. There is used a nutrient solution, containing, per litre of tap water, 20 grams of distillers' solubles, 20 grams of malt extract, 1 gram of sodium nitrate and 5 grams of sodium chloride. The nutrient solution is sterilized in an inoculation flask or in a fermenter for 20–30 minutes under 1 atmosphere gauge pressure. The sterilized nutrient solution has a pH value of 7.5 to 8.0. There is used for inoculation up to 10% of a partially sporulating vegetable culture of the organism. Incubation is carried out while shaking or stirring well at 27° C., cultures in fermenters being aerated with about 1 volume of sterile air per volume of solution per minute. After 48–120 hours the culture solution attains the highest checking value towards the test organisms (*B. subtilis, Micrococcus pyogenes,* var. *aureus, Escherichia coli,* Klebsiella). The mycelium and any solid constituents are separated by filtration or centrifuging from the solution containing the bulk of the antibiotic, about 1% of a filtration assistant, for example, Hyflo Supercel, being added to the culture solution before filtration, if desired. The filter residue is washed with water and aqueous methanol and the washings are combined with the antibiotically active culture filtrate.

By using, instead of the aforesaid nutrient solution, one which contains per liter of tap water, the following nutrient substances culture filtrates having a similarly high antibiotic activity are obtained by cultivation and working up in an analogous manner.

(a)

| | Grams |
|---|---|
| Lactose | 20 |
| Distillers' solubles | 20 |
| Sodium chloride | 5 |
| Sodium nitrate | 1 |

(b)

| | |
|---|---|
| Glucose | 10 |
| Distillers' solubles | 10 |
| Sodium chloride | 5 |
| Sodium nitrate | 1 |
| Calcium carbonate | 10 |

(c)

| | |
|---|---|
| Mannitol | 20 |
| Distillers' solubles | 20 |
| Sodium chloride | 3 |
| Sodium nitrate | 1 |

(d)

| | |
|---|---|
| Glycerine | 20 |
| Soya bean meal | 10 |
| Sodium chloride | 5 |
| Sodium nitrate | 1 |
| Calcium carbonate | 10 |

(e)

| | |
|---|---|
| Glucose | 20 |
| Soya bean meal | 10 |
| Sodium chloride | 5 |
| Sodium nitrate | 1 |
| Calcium carbonate | 10 |

*Example 2*

7 liters of a culture filtrate obtained as described in Example 1 are filtered through a layer of 700 ml. of Asmit 40 centimeters high at a speed of flow of 4 liters per hour. The antibiotic is completely adsorbed. The column is then washed with 2 liters of water at a speed of flow of 7–8 liters per hour, and the column is eluted with a mixture of methanol-water-1 N-hydrochloric acid in the volumetric ratio 75:15:10. The elution agent is collected in fractions of 1 liter each. Fractions Nos. 2–4, which contain up to 80% of the antibiotic activity present in the cutlure filtrate, are combined (about 3 liters). The hydrochloric acid in the eluate is neutralized with dilute caustic soda solution, ithe necessary quantity of caustic soda solution being first determined by titrating an aliquot portion of the eluate diluted with twice its volume of water. The neutral solution is concentrated to 200 ml. at 35° C. in a rotary evaporator, and is then filtered through a filter paper and the residue is washed with a little water. By freeze drying the crude antibiotic is obtained from the filtrate in the form of a brown powder. The yield amounts to about 7 grams per liter of culture filtrate.

*Example 3*

100 liters of the culture obtained as described in Example 1 are stirred with 2 kilograms of Norit for one hour, the whole of the antibiotic activity being adsorbed on the active carbon. The latter is separated by filtration, advantageously with the addition of a filtration assistant, for example, Hyflo Supercel, and is then washed three times with 20 liters of distilled water, each time, the mixture being stirred mechanically for 30 minutes and then filtered each time. The washing solution is antibiotically inactive. The carbon is then stirred 30 minutes with 20 liters of an aqueous solution of 30% strength of alcohol, and again separated by filtration. This operation is repeated with 20 liters and finally with 10 liters of alcohol of 30% strength. The combined aqueous alcoholic filtrates contain 0.5 to 0.6 gram of dry substance per liter having only little antibiotic activity. The active carbon is then similarly eluted with 3 portions (2 x 20 liters, 1 x 10 liters) of alcohol of 60% strength. The eluates contain a high antibiotic activity. They are combined and evaporated to a small volume in a thin layer evaporator at at most 30° C. The concentrated aqueous solution so obtained is poured into 5 times its volume of acetone, whereby the antibiotic Grisonomycin precipitated preponderantly in the form of a pale yellow powder. After allowing the mixture to stand for several hours at 0° C., the supernatant solution is separated by decantation from the residue, and the residue is washed with dry methanol. The residue which remains is dried well in vacuo. There are obtained 7–8 grams of crude antibiotic Grisonomycin in the form of a pale yellow powder (fraction 1). The combined acetone and methanol solutions contain a further 12–13 grams of substance, which is isolated by removing the solvent in vacuo. It possesses a smaller specific antibiotic activity (fraction 2).

*Example 4*

1 liter of a culture filtrate obtained as described in Example 1 is stirred with 15 grams of Norit for one hour. The active carbon is separated from the antibiotically inactive solution by filtration, advantageously with the addition of a filtration assistant, for example, Hyflo Supercel. The active carbon is washed by shaking it for ½ hour with 200 ml. of water and then filtered off. It is washed in the same manner with 200 ml. of methanol of 30% strength, and the carbon is then sharply filtered off on a glass filter, the washings are antibiotically inactive. The washed carbon adsorbate is eluted by shaking it for one hour with 200 ml. of a mixture of butanol-methanol-water in the volumetric ratio 2:1:2. The dark colored solution freed from the carbon by filtration contains about 70% of the antibiotic activity present in the culture filtrate. The solution is agitated with 100 ml. of n-butyl acetate. The two phases so formed are separated from one another. The aqueous dark colored phase amounting to 140 ml. contains practically the whole of the antibiotic activity present in the eluate, and is then subjected to freeze drying. The crude antibiotic Grisonomycin is obtained as a dark yellow powder. The yield amounts to 0.93 gram.

*Example 5*

15 grams of a carbon adsorbate obtained as described in Example 4 and washed with water and methanol of 30% strength are agitated with 200 ml. of a mixture of butanol-methanol-pyridine-water in the volumetric ratio 2:1:1:2 for one hour. The dark colored eluate, after being freed from carbon by filtration through a glass suction filter contains up to 80% of the antibiotic activity present in the culture filtrate. The solution is agitated with 100 ml. of n-butyl acetate. The aqueous phase amounting to 110 ml. which separates and contains the antibiotic activity is concentrated to a small volume on a rotary evaporator at 35° C. From the concentrated solution the crude antibiotic Grisonomycin is obtained by freeze drying in the form of 1.01 grams of a brown-yellow powder.

Example 6

5 grams of an antibiotic concentrate (fraction 2) obtained as described in Example 3 are chromatographed over a column 5.5 centimeters high of a mixture of 10 grams of Norit and 20 grams of Hyflo Supercel, the substance being applied to the column in the form of an aqueous solution of 10% strength. Fractions up to ½ liter are collected. Fractions 1–6, which are eluted with water, are evaporated and contain 4.3 grams of antibiotically inactive material. From fractions 7–10, which are eluted with alcohol of 10% strength there are obtained 155 milligrams of dry substance which is also antibiotically inactive. Fractions 11–14 eluted with alcohol of 30% strength, and fraction 15 eluted with 2 liters of alcohol of 60% strength, together contain 140 milligrams of the enriched antibiotic Grisonomycin, which is obtained in the form of a beige powder from the solutions by evaporating them on a rotary evaporator at 35° C. followed by freeze drying.

Example 7

10 grams of an antibiotic concentrate (fraction 2) obtained as described in Example 3 are dissolved in 100 ml. of water and 5 grams of crystalline helanthin (orange III, sodium salt of 4'-dimethylamino-azobenzene-4-sulfonic acid) are added. The suspension is strongly stirred in a vibro mixer for one hour, and then filtered over 10 grams of Hyflo Supercl. The filtrate is freed from excess of helianthin by passing it through 50 ml. of Amberlite IRA–400, polystyrene quaternary ammonium anionic resin (United States Patent No. 2,591,573) in the chloridion form. The ion exchanger is washed with 200 ml. of water, and the filtrate mixed with the washings is concentrated in vacuo to a small volume at 35° C. The antibiotic more highly enriched than the starting material is obtained in the form of a powder (6 grams) from the concentrated solution by freeze drying. The helianthate mixture in the residue which has been filtered off contains a small amount of an antibiotically active substance whose spectrum of biological activity differs from that of antibiotic Grisonomycin.

Example 8

8.1 grams of an antibiotic preparation (fraction 1) obtained as described in Example 3 are chromatographed over 647 grams of ash-free cellulose powder Whatman standard grade. For this purpose the cellulose powder is charged in portion into a glass column and each portion is compressed as tightly as possible by means of a plug of stainless steel which exactly fits the column, so that each portion forms a layer about 5 centimeters high. In this manner a homogeneous cellulose column 70 centimeters high and 5.5 centimeters in diameter is produced. The column is washed twice for a period of 24 hours each time with a mixture of butanol-methanol-water in the volumetric ratio 4:1:2 at a speed of flow of 70 ml. per hour. The substance to be chromatographed is dissolved in 100 ml. of water and 50 ml. of methanol and 50 ml. of butanol are added. Before the latter solution is applied to the column, the latter is "acclimatized," that is to say, there are applied to the column small portions of the butanol-methanol-water mixture of decreasing butanol content in such manner that a fresh portion is applied, while avoiding turbulence immediately after the preceding portion has soaked completely into the cellulose. In this manner there are applied 20 ml. of a butanol-methanol-water mixture in the ratio 3:1:2, 20 ml. of a like mixture in the ratio 2:1:2 and 20 ml. of a like mixture in the ratio 1:1:2. The aforesaid 200 ml. of solution are then allowed to soak into the column, and then the application of small portions of the butanol-methanol-water mixture having an increasing content of butanol is commenced. To this end there are used 10 ml. of the mixture in the ratio 1½:1:2, 20 ml. of the mixture in the ratio 2:1:2 and 20 ml. of the mixture in the ratio 3:1:2. The column is then developed with a mixture in the ratio 4:1:2. Fractions are collected up to 135–140 ml. 50 ml. of ether are added to each antibiotically active fraction, and it is extracted three times with 20 ml. of water. The combined aqueous phases are washed by agitation with 50 ml. of ether and then a beige powder is obtained by freeze drying. Fractions 7–26 contain antibiotically active material, the maximum activity being present in fractions 11–20. The latter fractions are combined and there are obtained therefrom 1.45 grams of enriched antibiotic Grisonomycin.

Example 9

780 milligrams of an enriched antibiotic concentrate obtained as described in Example 8 are chromatographed over 154 grams of ash-free cellulose powder Whatman standard grade. In the manner described in Example 8 a column of cellulose 62 centimeters high is built up in a chromatogram tube of 3 centimeters internal diameter. The column is washed four times for a period of 24 hours each time with a butanol-methanol-water mixture in the volumetric ratio 4:1:2 at a speed of slow of 20 ml. per hour. The substance is dissolved in 5 ml. of water and 2.5 ml. of methanol and 4 ml. of butanol are added. Before applying the solution the column is "acclimatized" as described in Example 8, for which purpose 2 ml. of the mixture in the ratio 3:1:2, 2 ml. of the mixture in the ratio 2:1:2 and finally 2 ml. of mixture in the ratio 1.6:1:2 are used. The solution is then applied and the cellulose column is supplied with 2 ml.-portions of the butanol-methanol-water mixture in the ratio 2:1:2, 2½:1:2, 3:1:2 and 3½:1:2. The column is then developed with a like mixture in the ratio 4:1:2 at a constant temperature of 25° C. Fractions are collected each amounting to 40 ml. The antibiotically active fractions 14–33 are individually agitated with 50 ml. of ether-chloroform (4:1). The aqueous phase which thereby separates out and contains the antibiotic activity, is separated and the organic phase is agitated twice with 5 ml. of water. The combined aqueous phases (about 20 ml.) are washed with 20 ml. of ether-chloroform (4:1), and converted into a pale yellow powder by freeze drying. Fractions 19–21 possess the highest antibiotic activity. They are combined and there is obtained therefrom a total of 75 milligrams of pure antibiotic Grisonomycin, which, as compared with the material present in the culture filtrate, possesses about 300 times the antibiotic activity. The pure antibiotic Grisonomycin dissolves very easily in water. It is sparingly soluble to insoluble in organic solvents, especially lipoid solvents. It behaves as a unitary substance in paper chromatography in the solvent mixtures A to I (see the foregoing table) and in these solvent mixtures differs from the other known water-soluble antibiotics, for example, streptomycin, neomycin, ristocetin A and B and viomycin. Antibiotic Grisonomycin cannot be precipitated from neutral concentrated aqueous solutions by means of picric acid, helianthin, ammonium reineckate or picrolonic acid. From such solutions it is not adsorbed by weakly acid or weakly basic ion-exchangers. It gives no color reaction according to Sackaguchi, Ehrlich, Benedict and Elson-Morgan. Its biuret reaction is negative.

Example 10

10 g. of antibiotic preparation obtained as described in Example 4 are dissolved in 100 m of water and adjusted to a pH of about 1 with 5 N HCl. This solution is extracted twice with 100 ml. of a mixture of 100 g. of phenol in 100 ml. of chloroform, the organic extract has but little antibiotic activity and is discarded. The aqueous solution is adjusted to pH 6.5 by the addition of solid potassium bicarbonate and extracted in three portions with a total of 150 ml. of a solution of 300 g. of phenol per liter of chloroform. The exhausted aqueous solution is discarded. The phenol chloroform extract is filtered through a thin layer of Celite and the filtrate is extracted three times with 20 ml. of 0.1 N-hydrochloric acid. The pH of the hydrochloric acid extracted which contains the antibiotic is adjusted to 2 and extracted in five portions with a total of 100 ml. of a mixture of 100 g. of phenol in 100 ml. of chloroform. The chloroform extract is filtered again through Celite, mixed with 50 ml. of water, 300 ml. of ether, and 300 ml. of petroleum ether, and agitated thoroughly. The aqueous phase is separated and the organic phase washed several times with small amounts of water. The aqueous phases are combined and shaken several times with ether to remove the phenol, and then lyophilized. 85 mg. of a beige-colored powder of high antibiotic activity are obtained.

What is claimed is:

1. Process for the manufacture of an antibiotic, which comprises culturing *Streptomyces griseus* A–10073 under aerobic conditions in an aqueous nutrient solution containing a source of carbon and of nitrogen and inorganic salts until the solution has a substantial antibiotic activity and the antibiotic Grisonomycin is isolated from the nutrient solution.

2. Process according to claim 1, wherein the cultivation is performed by the submersion method.

3. Process according to claim 1, wherein the cultivation is performed for 36–120 hours at a temperature between 18 and 40° C.

4. Process according to claim 1, wherein the antibiotic is isolated from the nutrient solution by adsorption.

5. Process according to claim 1, wherein activated carbon is used as adsorbing agent.

6. Process according to claim 1, wherein a m-phenylenediamine-formaldehyde decolorizing resin is used as adsorbing agent.

7. Process according to claim 1, wherein a strongly acid ion exchanger is used as adsorbing agent.

8. Process according to claim 1, wherein the adsorbed antibiotic is eluted with an organic solvent partially miscible with water.

9. Process according to claim 1, wherein the antibiotic is isolated by absorption then elution and the eluates are concentrated at a low temperature under reduced pressure, and the antibiotic is isolated from the concentrate by precipitation with acetone.

10. Process according to claim 1, wherein the antibiotic is isolated from the nutrient solution by adsorption and the adsorbed antibiotic is eluted with a mixture of water and an organic solvent miscible with water.

11. Process according to claim 10, wherein the elution liquid is a mixture of butanol, methanol and water.

12. Process according to claim 10, wherein the elution liquid is a mixture of butanol, methanol, pyridine and water.

13. Process according to claim 10, wherein the elution liquid is a mixture of ethanol and water.

14. Process according to claim 10, wherein the elution liquid is a mixture of methanol, hydrochloric acid and water.

15. Process according to claim 10, wherein the elution liquid used is aqueous ammonia.

16. Process according to claim 1, wherein the antibiotic is enriched by distribution between solutions of phenol in chloroform and aqueous solutions.

17. Process according to claim 16, wherein the phenol content of the chloroform solution is varied.

18. Process according to claim 16, wherein the pH value of the aqueous solution is varied.

19. Process according to claim 1, wherein the antibiotic is enriched by chromatography on cellulose.

20. Process according to claim 19, wherein the chromatogram is developed with a mixtxure of butanol, methanol and water.

21. Process according to claim 19, wherein the chromatogram is developed with aqueous ethanol.

22. Process for the purification of Grisonomycin, which comprises removing inactive byproducts by precipitation with the salt of a dyestuff having sulfonic acid groups.

23. Process for the purification of Grisonomycin, which comprises removing inactive byproducts by precipitation with picric acid.

24. The antibiotic Grisonomycin, a water-soluble antibiotic, soluble in phenol and mixtures of phenol with chloroform, insoluble in lipoid solvents, not precipitable with picric acid, picrolonic acid, Helianthin, ammoniumreineckate, adsorbable on phenylenediamine-formaldehyde decolorizing resin, activated carbon, cellulose; not adsorbable on phenolic amine anionic resin, methacrylic carboxylic acid cationic resin, polystyrene quaternary ammonium anionic resin; showing in paper chromatography on Whatman No. 1 paper the following $R_f$-values:

0 in butanol saturated with water;
0 in butanol saturated with water +2% of paratoluene sulfonic acid;
0.15 in aqueous ethanol of 80% strength containing 1.5% of sodium chloride on Whatman No. 4, impregnated with 0.95 m $Na_2SO_4$ and 0.05 m $$NaHSO_4—H_2O$$

0.52 in aqueous methanol of 80% strength containing 1.5% of sodium chloride;
0.65 in butanol-ethanol-water, 1:1:2;
0.92 in water saturated with methyl isobutyl-ketone;
0.90 in 75% of water +25% of a mixture of 3 parts of methanol and 1 part of acetone, the whole being brought to a pH value of 10.5 with ammonia and brought back to a pH value of 7.5 with phosphoric acid;
0.11 in secondary butanol saturated with water +0.2% of trichloracetic acid;

migrating in electrophorese on Whatman No. 1 paper in a phosphate buffer solution of pH 5.5 at a voltage of 110 volts and in the course of 5 hours 4.2 centimeters, in a borate buffer of pH 8.13 and otherwise identical conditions 2.9 centimeters towards the cathode, and giving negative Sackaguchi, Maltol, Elson-Morgan, biuret and Benedict test, said Grisonomycin being produced by the process of claim 1.

No references cited.